H. S. PRATT.
SHEARS.
No. 33,227.
Patented Sept. 3, 1861.
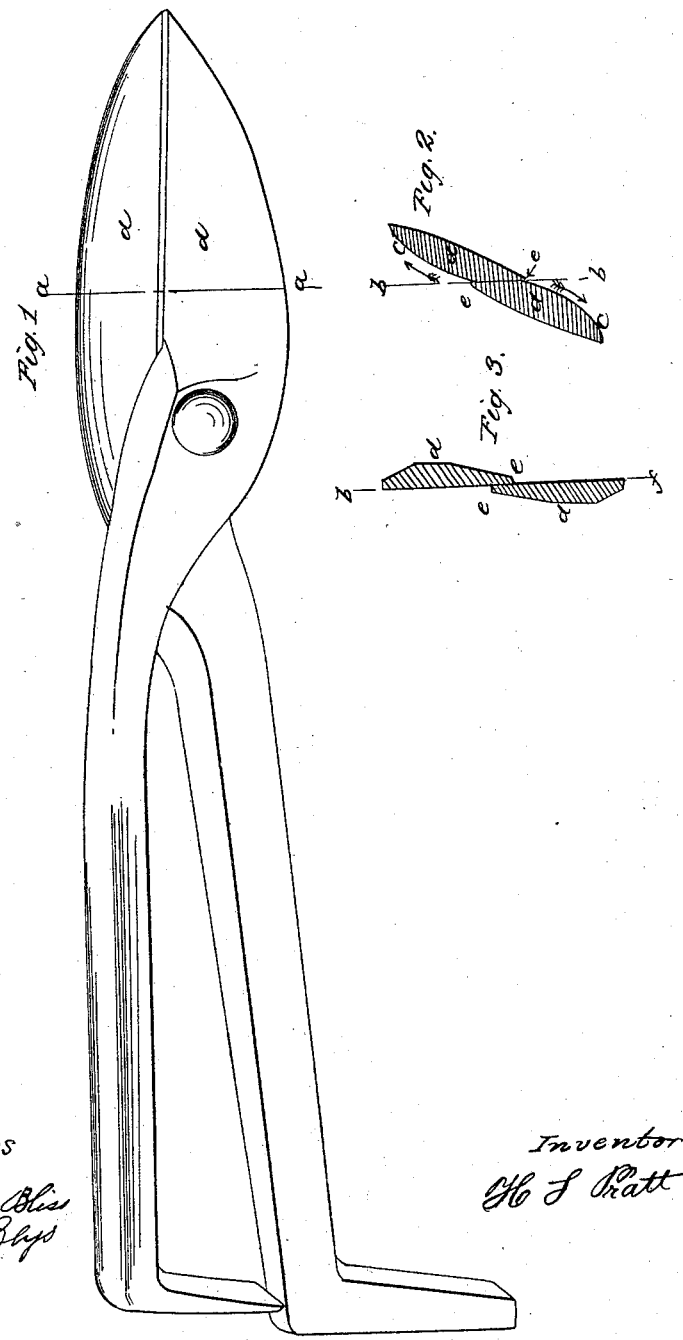
Witnesses
Inventor
H. S. Pratt

UNITED STATES PATENT OFFICE.

HENRY S. PRATT, OF HARTFORD, ASSIGNOR TO J. J. HOUGH & CO., OF MERIDEN, CONNECTICUT.

IMPROVED TINSMITH'S SHEARS.

Specification forming part of Letters Patent No. 33,227, dated September 3, 1861.

*To all whom it may concern:*

Be it known that I, HENRY S. PRATT, of the city and county of Hartford, and State of Connecticut, have invented certain new and useful Improvements in Tinsmiths' Shears; and I do hereby declare that the same is described and represented in the following specification and drawings, and to enable others skilled in the art to make and use my said improvement I will proceed to describe its construction and operation, referring to the drawings, in which the same letters indicate like parts in each of the figures.

The nature of this improvement in tinsmiths' shears consists in diverging or curving the face, or what may be called the "face side," of the back of the blades of the shears, commencing on the face side of the blades and near the cutting-edges and diverging or curving them outward from the cutting-edges, and from a line drawn perpendicularly between the blades in the direction of the motion of the blades when in use, they being made otherwise like those in common use.

In the accompanying drawings, Figure 1 shows a pair of tinsmiths' shears made in all respects like those now in common use, except the cutting-blades $d\ d$, a section of which is cut through the line $a\ a$ in Fig. 1 and shown in Fig. 2. The line $b$ is drawn through between the surfaces of the blades that work together and indicates the direction of their motion. $e$ are the cutting-edges. $d$ are the blades. $c$ shows the face side or surface of the blades $d$, which work together near the edges $e$ and diverging or curving outward from the line $b$, as indicated by the dart.

Fig. 3 is a section showing the blades of shears, in shape nearly like those ordinarily constructed or as now in common use, which have their inner surfaces that work together straight, as shown by line $b$.

The advantage believed to be derived from this improvement in tinsmiths' shears over others now in use may be briefly stated as follows: They will hold their cutting-edge longer, work more freely and easily, avoid the ordinary cramp and friction of the edge of the metal against the sides of the blades, because the metal sheet, held by one hand while the improved shears are operated by the other, is more easily controlled and moved as required, on account of the diverging shape of that portion of the blades $c\ c$ above and below the cutting-edges, thereby producing what may be truly called an "improved article of (old) manufacture."

I believe I have thus shown the nature, construction, and the advantage to be derived from this improvement over others now in use to enable a person skilled to make and use the same.

What I claim, therefore, and desire to secure by Letters Patent, is—

As an improved article of (old) manufacture—viz., tinsmiths' shears having the back of the inner surfaces of the blades or jaws made diverging or curved from the line of motion of the working-surfaces, substantially in the manner as and for the purpose described.

In testimony whereof I have hereunto set my hand and seal this 29th day of November, 1860.

HENRY S. PRATT. [L. S.]

Witnesses:
R. R. BLISS,
JEREMY W. BLISS.